Sept. 16, 1947.  W. A. NIEMANN  2,427,570
HYDRAULIC COUPLING OR FLUID PUMP
Filed Oct. 2, 1945  3 Sheets-Sheet 1
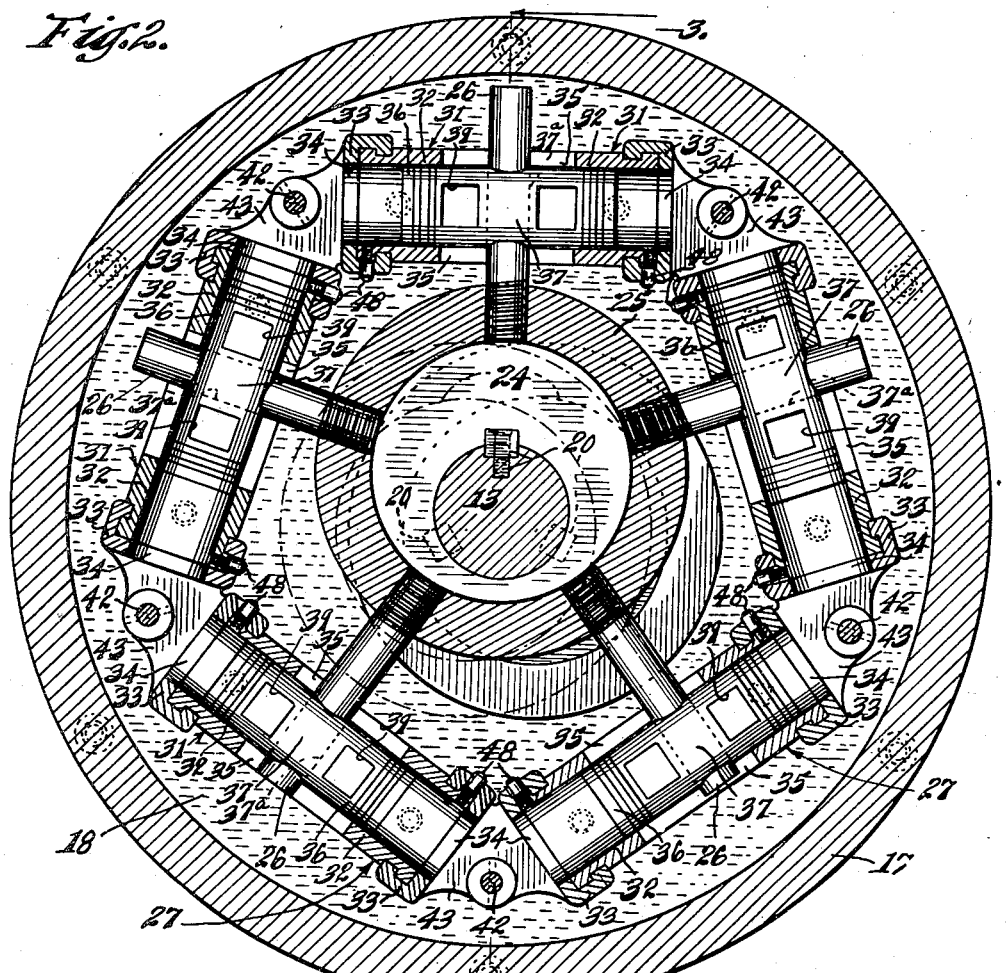
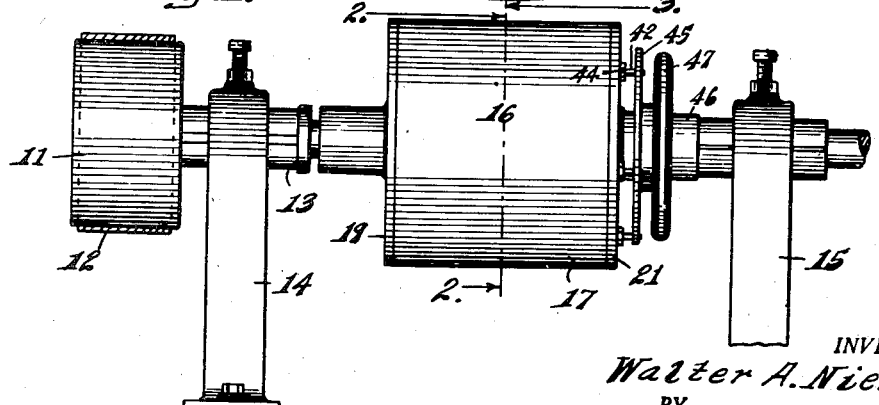
INVENTOR.
Walter A. Niemann.
BY
Bair & Freeman
Att'ys.

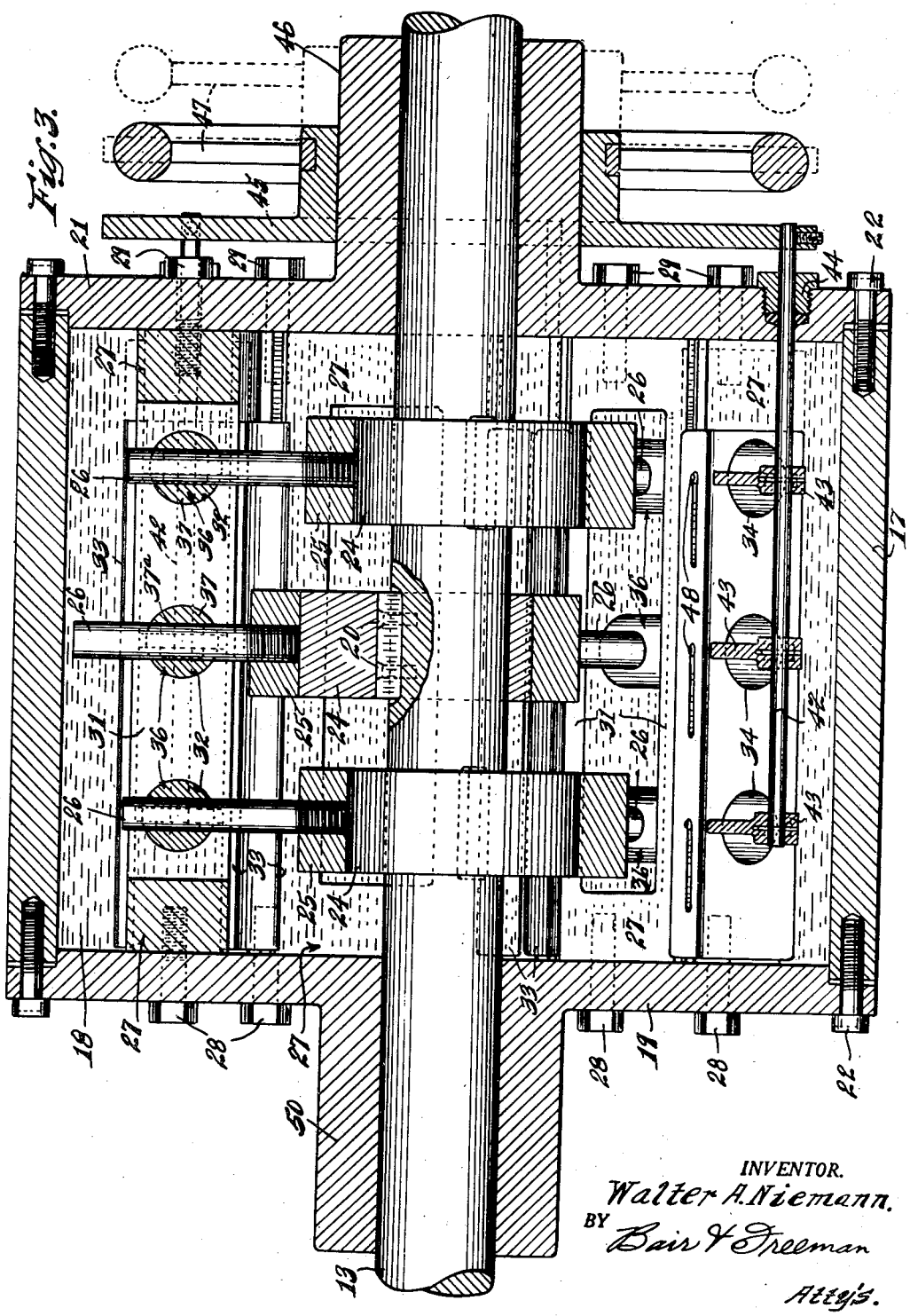

Sept. 16, 1947. W. A. NIEMANN 2,427,570
HYDRAULIC COUPLING OR FLUID PUMP
Filed Oct. 2, 1945 3 Sheets-Sheet 3
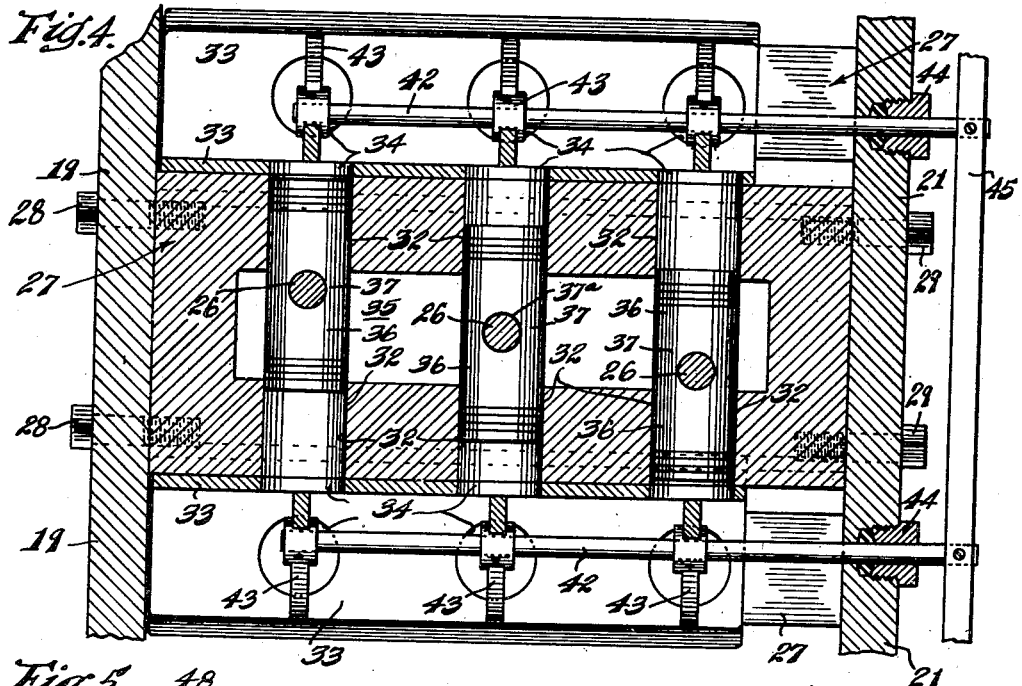
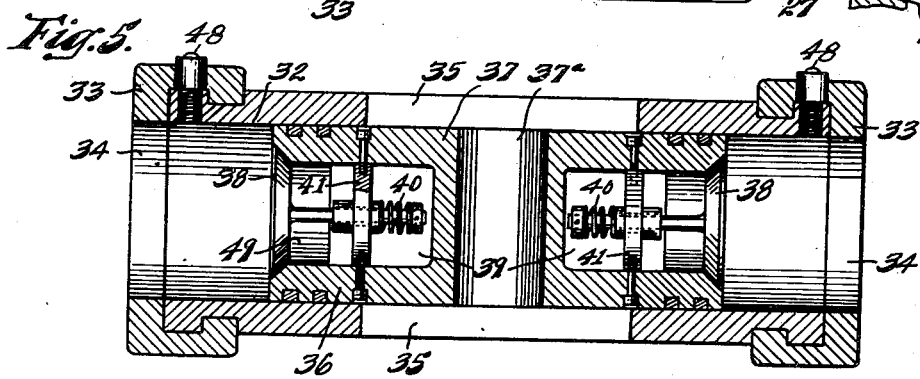
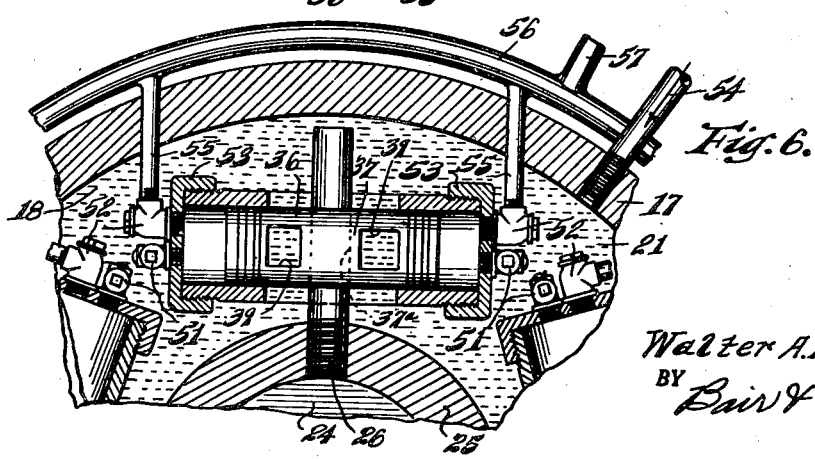
INVENTOR.
Walter A. Niemann.
BY Baird & Freeman
Atty's.

Patented Sept. 16, 1947

2,427,570

UNITED STATES PATENT OFFICE 2,427,570

HYDRAULIC COUPLING OR FLUID PUMP

Walter A. Niemann, Chicago, Ill.

Application October 2, 1945, Serial No. 619,838

9 Claims. (Cl. 192—60)

This invention relates to a hydraulic coupling or to a fluid pump, the operations of the mechanism as a coupling or a pump depending on the valve mechanism and piping employed.

It is an object of the invention to provide an entirely novel mechanism for translating rotary motion to reciprocating motion.

It is another object of the invention to provide a hydraulic coupling or drive utilizing a novel motion translating mechanism.

It is also an object of the invention to provide a fluid pump by utilizing my new motion translating mechanism.

It is a further object of the invention to provide a hydraulic drive mechanism which is relatively small and compact and which is capable of transmitting large quantities of power at high speed, if desired, without undue overheating, frictional losses or excessive fluid pressures.

It is still another object of the invention to provide an improved speed control for a hydraulic drive or coupling.

It is an additional object of the invention to provide a novel piston and valve arrangement for a hydraulic coupling.

It is still a further object of the invention to provide a new operating mechanism for driving pistons in a hydraulic coupling.

With these and other objects in view, my invention consists in the construction, arrangement and combination of the various parts of my hydraulic coupling or fluid pump whereby the objects contemplated are attained, as hereinafter more fully set forth, pointed out in the claims, and illustrated in the accompanying drawings, in which:

Fig. 1 is an elevational view of the new hydraulic drive applied to a sheave and having a driving sheave associated therewith;

Fig. 2 is a vertical sectional view of the hydraulic coupling or drive taken on line 2—2 of Fig. 1;

Fig. 3 is a sectional view of the hydraulic coupling or drive taken on line 3—3 of Fig. 2;

Fig. 4 is a detail sectional view of the cylinder block and pistons;

Fig. 5 is a detail sectional view of a single piston and cylinder; and

Fig. 6 is a partial sectional view of the invention applied to a fluid pump.

Referring specifically to the drawings for a detailed description of the first embodiment of the invention, as shown in Fig. 1 numeral 11 designates a driving sheave which may be driven from a motor (not shown) by a belt 12. An input power shaft 13 supported by stanchions 14 and 15 connects the driving sheave to a hydraulic coupling or drive, generally indicated at 16, and the hydraulic coupling in the illustrated embodiment drives a sheave 17. Obviously the invention is not limited to a hydraulic drive for a sheave.

Referring now to Figs. 2 to 5 inclusive, the hydraulic coupling 16 is provided with a chamber 18 formed by a sheave 17 and two end plates or walls 19 and 21 bolted to the sheave 17 by bolts 22 in such a manner as to provide a liquid tight joint. The chamber 18 is preferably entirely filled with a liquid, such as oil, of fairly high viscosity, although the chamber 18 need not be completely filled, as will be obvious from the following description.

The shaft 13 extends through the chamber 18 and is provided with suitable sealing glands or rings (not shown) in a manner well understood in the art. The shaft 13 is preferably provided with spaced eccentrics 24, the eccentrics being 120 degrees out of phase with one another, by way of example. The eccentrics 24 are retained in position on the shaft 13 by pins 20. Eccentric straps 25 are also provided on each eccentric 24 and a plurality of extensions or fingers 26 threaded into the straps 25, five being shown by way of example, extend radially outwardly from the straps 25.

A main cylinder block generally indicated at 27 is attached by bolts 28 and 29 to the end plates 19 and 21. The main cylinder block 27 forms a web surrounding the shaft 13 and comprises five banks of individual cylinder blocks 31, each bank containing three cylinders 32. As best shown in Figs. 4 and 5, the top of each cylinder block is covered by a sliding U-shaped bar or valve plate 33 having three openings 34 therein corresponding to each cylinder 32 and providing an outlet valve for each cylinder as will be described hereinafter. Each cylinder 32 is open at both ends and valve plates 33 are, therefore, provided at both ends. The cylinders 32 are also provided with central slots 35, 180 degrees apart, through which the rods or fingers 26 extend, as best shown in Fig. 2.

A double piston 36 is provided for each cylinder 32 and is generally hollow to provide two piston portions, but is solid at its center, as shown at 37 to provide for a bored hole 37a through which the rods 26 extend to impart reciprocating motion to the pistons. As shown in Fig. 5, the pistons 36 are each provided with two poppet type inlet valves 38 and are ported at 39. The valves are biased slightly toward the open position by springs 40 and are provided with a valve stem support 41.

The U-shaped valve plates 33 are connected to rods 42 by ears 43 and the rods extend through one of the end plates 21, suitable glands 44 being provided to prevent the leakage of oil at these points. As shown best in Fig. 3, the rods 42 are connected to a plate and bushing 45 which is slidably mounted on an extension 46 of end plate 21, which also provides a bearing for the sheave 17 on the main shaft 13. A similar bearing 50 is provided at the other end of the sheave. A hand wheel 47 is secured to the extension 46. The hand wheel 47 may be grasped to slide the plate and bushing 45 along the extension 46 to thus move the rods 42 and the valve plates 33 across the tops of the cylinders 32.

Under the conditions shown in Fig. 3 the sheave 17 is not rotated because no force is imparted thereto from the shaft 13.

If it is now desired to rotate the sheave 17 at some predetermined speed less than the shaft 13, or to slowly apply a load, the hand wheel 47 is moved to move rods 42 and slide valve plates 33 to partially close the tops of the cylinders. This causes a force to oppose the reciprocating motion of the pistons 36 because oil is now pumped by the pistons against a restriction and the opposing force rotates the entire cylinder block and the sheave 17 at a speed depending on the force necessary to pump the oil back into the chamber 18 from all the cylinders 32.

If the tops of the cylinders are closed altogether by moving the hand wheel 47, rods 42 and slide valve plates 33 to the position shown in the dotted lines in Fig. 3, the pistons 36 become hydraulically locked and cannot move, whereupon the main cylinder block and sheave 17 rotate at the same speed as the shaft 13.

The shaft 13 rotates the eccentrics 24 and in turn the eccentric straps move to the various dotted positions shown in Fig. 2. The rods or fingers 26 on the eccentric strap, therefore, move toward and away from the center of rotation of the shaft 13 and reciprocate in straight lines in the openings 37a in the centers of the pistons 36. The pistons are also reciprocated because the fingers 26, in addition to their reciprocal movement, move in straight lines always at an angle of 90 degrees from the straight line reciprocating movement thereof. Oil flows in and out of the cylinder 32, either through the open tops thereof, or through the poppet valves 38, or both.

As the pistons reciprocate, on their suction stroke, the poppet valves 38 raise slightly against the slight bias of springs 40 and when the ports 39 are uncovered toward the end of the suction stroke, oil from chamber 18 enters the interior of the piston and passes through an opening 49 therein past the poppet valve 38. On the discharge stroke, the poppet valves 38 are closed by the oil in the cylinders 32.

If desired, ball check valves 48 may be provided at the ends of each cylinder 32, which valves communicate with the interior of each cylinder so that if a vacuum condition occurs or if the oil in the cylinders cavitates, oil from the main reservoir in the chamber 18 may enter the cylinders through the check valves 48.

*Operation of hydraulic drive or coupling*

When power is applied to the driving sheave 11 to rotate the shaft 13, it may be desirable to have no load for starting and to gradually apply load, in which case the hydraulic coupling operates as a friction clutch. Or it may be desirable to start with no load and then set the speed of rotation of the sheave 17. In either instance, the sliding valve plate 33 is moved by hand wheel to the position shown in the full lines of Fig. 3, whereupon the openings 34 in the sliding valve plate 33 are in registration with the tops of the cylinders. As the valves 33 are moved to the closed position infinite variations in speed from zero to the maximum speed of the driving shaft are obtained. It is also clear that the device may be made to maintain a constant speed under varying loads by providing a governor control to properly position the slide valve plates 33 upon changes in the load.

This apparatus, with minor changes may be utilized as a pump for liquids or gases. Exactly the same motion and parts are used except that the casing which forms the sheave 17 is secured in a stationary position and conventional inlet and outlet valves diagrammatically shown at 51 and 52, respectively, are provided in a fixed head 53 on each cylinder 32. The inlet valve 51 communicates with the chamber 18 and the chamber 18 is provided with an inlet 54 from a source of fluid to be pumped. The outlet valves 52 permit fluid to be discharged through conduits 55 to a manifold 56 having an outlet 57.

As the main shaft is rotated, the pistons 36 are reciprocated and withdraw liquid or gas from the chamber 18 and force it into the manifold 56 and to the outlet 57.

From the foregoing it will be apparent that I have provided a new and useful mechanism for translating rotary motion to reciprocating motion; which mechanism may be utilized as a hydraulic coupling or drive, as a clutch or as a fluid pump.

Some changes may be made in the construction and arrangement of the parts of my hydraulic coupling or fluid pump without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. An apparatus for transmitting the rotary motion of a shaft to reciprocating motion of a piston comprising an eccentric rotated by said shaft, an eccentric member surrounding and slidable with respect to said eccentric, a radial extension on said eccentric member, said radial extension, when said shaft is rotated, being reciprocated in straight lines toward and away from the center of rotation of the shaft and also being moved backward and forward in a straight line at an angle of 90 degrees to said reciprocating movement, a bearing in said piston for said radial extension, said bearing permitting said radial extension to freely reciprocate therein and also transmitting said straight line motion at an angle of 90 degrees to said reciprocating motion to said piston, thereby reciprocating the piston, and a cylinder for said piston.

2. Apparatus for transmitting the rotary motion of a shaft to reciprocating motion of a piston comprising an eccentric rotated by said shaft, an eccentric strap surrounding said eccentric, a radial extension on said eccentric strap, said radial extension, when said shaft is rotated, being reciprocated in straight lines toward and away from the center of rotation of the shaft and also being moved backward and forward in a straight line at an angle of 90 degrees to said reciprocating movement, a bearing in said piston for said radial extension, said bearing permitting said radial extension to freely reciprocate therein and also transmitting said straight line motion at an angle of 90 degrees to said reciprocating motion to said piston, thereby reciprocating the piston, and a cylinder for said piston, said piston having two pumping surfaces and said cylinder being double for receiving the two pumping surfaces of the piston.

3. Apparatus for transmitting the rotary motion of a shaft to reciprocating motion of a piston comprising an eccentric rotated by said shaft, an eccentric strap surrounding said eccentric, a radial extension on said eccentric strap, said radial extension, when said shaft is rotated, being reciprocated in straight lines toward and away from the center of rotation of the shaft and also being moved backward and forward in a straight line at an angle of 90 degrees to said reciprocating movement, a bearing in said piston for said radial extension, said bearing permitting said radial extension to freely reciprocate therein and also transmitting said straight line motion at an angle of 90 degrees to said reciprocating motion to said piston, thereby reciprocating the piston, and a cylinder for said piston, said piston having two pumping surfaces, said cylinder being double for receiving the two pumping surfaces of the piston, said cylinder having slots therein through which said radial extension extends, said slots affording said straight line motion of the radial extension at an angle of 90 degrees to the reciprocating motion.

4. Apparatus for transmitting the rotary motion of a shaft to reciprocating motion of a plurality of pistons comprising an eccentric rotated by said shaft, an eccentric strap surrounding said eccentric, a plurality of radial extensions on said eccentric strap, said radial extensions, when said shaft is rotated, being reciprocated in straight lines toward and away from the center of rotation of the shaft and each radial extension also being moved backward and forward in a straight line at an angle of 90 degrees to said reciprocating movement, a bearing in each of said pistons for said radial extensions, said bearings permitting said radial extensions to freely reciprocate therein and also transmitting the straight line motion at an angle of 90 degrees to said reciprocating motion to said pistons, thereby reciprocating the pistons, and a cylinder for each of said pistons.

5. Apparatus for transmitting the rotary motion of a shaft to reciprocating motion of a plurality of pistons comprising a plurality of eccentrics rotated by said shaft, an eccentric strap surrounding each of said eccentrics, a radial extension on each of said eccentric straps, said radial extensions, when said shaft is rotated, each being reciprocated in straight lines toward and away from the center of rotation of the shaft and also being moved backward and forward in a straight line at an angle of 90 degrees to said reciprocating movement, a bearing in each of said pistons for said radial extensions, said bearing permitting said radial extensions to freely reciprocate therein and also transmitting said straight line motion at an angle of 90 degrees to said reciprocating motion to said pistons, thereby reciprocating the pistons, and a cylinder for each of said pistons.

6. Apparatus for transmitting the rotary motion of a shaft to reciprocating motion of a plurality of pistons comprising a plurality of eccentrics rotated by said shaft, an eccentric strap surrounding each of said eccentrics, a plurality of radial extensions on each of said eccentric straps, said radial extensions, when said shaft is rotated, being reciprocated in straight lines toward and away from the center of rotation of the shaft and also being moved backward and forward in a straight line at an angle of 90 degrees to said reciprocating movement, a bearing in each of said pistons for said radial extensions, said bearings permitting said radial extensions to freely reciprocate therein and also transmitting said straight line motion at an angle of 90 degrees to said reciprocating motion to said pistons, thereby reciprocating the pistons and a cylinder for each of said pistons.

7. A hydraulic drive or coupling comprising a shaft, an eccentric rotated by said shaft, an eccentric member surrounding said eccentric, a radial extension on said eccentric member, a piston, a cylinder block for receiving said piston, a freely rotatable member attached to said cylinder block, means for varying the resistance to the motion of said piston of said cylinder block, said radial extension, when said shaft is rotated, being reciprocated in straight lines toward and away from the center of rotation of the shaft and also being moved backward and forward in a straight line at an angle of 90 degrees to said reciprocating movement, a bearing in said piston for the radial extension, said bearing permitting said radial extension to freely reciprocate therein and also transmitting said straight line motion at an angle of 90 degrees to reciprocating motion to said piston, thereby reciprocating the piston, a chamber formed by said freely rotatable member, said piston and cylinder block being contained within said chamber, a fluid in said chamber, and means for permitting ingress and egress of said fluid to and from said cylinder when the piston is reciprocated.

8. A hydraulic drive or coupling comprising a shaft, an eccentric rotated by said shaft, an eccentric strap surrounding said eccentric, a radial extension on said eccentric strap, a piston, a cylinder block for receiving said piston, a rotatable member attached to said cylinder block, said radial extension, when said shaft is rotated, being reciprocated in straight lines toward and away from the center of rotation of the shaft and also being moved backward and forward in a straight line at an angle of 90 degrees to said reciprocating movement, a bearing in said piston for the radial extension, said bearing permitting said radial extension to freely reciprocate therein and also transmitting said straight line motion at an angle of 90 degrees to said reciprocating motion to said piston, thereby reciprocating the piston, a chamber formed by said rotatable member, said piston and cylinder block being contained within said chamber, a fluid in said chamber and means for permitting ingress and egress of said fluid from said cylinder when said piston is reciprocated, said last means comprising intake and discharge valves, said discharge valve being adjustable to vary the resistance of the fluid to the pumping action of the said piston.

9. A hydraulic drive or coupling comprising a shaft, an eccentric rotated by said shaft, an eccentric strap surrounding said eccentric, radial extensions on said eccentric strap, a plurality of pistons, a cylinder block for receiving said pistons, a rotatable member attached to said cylinder, said radial extensions, when said shaft is rotated, being reciprocated in straight lines toward and away from the center of rotation of the shaft and also being moved backward and forward in a straight line at an angle of 90 degrees to said reciprocating movement, a bearing in each of said pistons for the radial extensions, said bearings permitting said radial extensions to freely reciprocate therein and also transmitting said straight line motion at an angle of 90 degrees to said reciprocating motion to said pistons, thereby reciprocating the pistons, said pistons and cylinder block being contained within a chamber in said rotatable manner, a fluid in said chamber and means for permitting ingress and egress of said fluid from said cylinder when said pistons are reciprocated, said last means comprising intake and discharge valves, said discharge valves being adjustable to vary the resistance of the fluid to the pumping action of the said pistons, said discharge valves being adjustable to a completely closed position to hydraulically lock the pistons, whereupon the rotatable means is rotated at the same speed as the shaft.

WALTER A. NIEMANN.